United States Patent [19]

Robecchi et al.

[11] Patent Number: 4,457,743

[45] Date of Patent: Jul. 3, 1984

[54] POWER TRANSMISSION BELT

[75] Inventors: Edoardo Robecchi, Sesto S. Giovanni; Renato Dell'Orta, Seregno, both of Italy

[73] Assignee: Industrie Pirelli S.p.A., Milan, Italy

[21] Appl. No.: 351,640

[22] Filed: Feb. 23, 1982

[30] Foreign Application Priority Data

Mar. 16, 1981 [IT] Italy .................. 20350 A/81

[51] Int. Cl.³ .................. F16G 1/00; F16G 5/00; F16G 1/26
[52] U.S. Cl. .................. 474/260; 474/261; 474/262; 474/263; 474/265; 474/268; 474/270
[58] Field of Search .............. 474/260, 263, 262, 261, 474/240, 244, 250, 270, 242, 252, 265, 250, 268

[56] References Cited

U.S. PATENT DOCUMENTS

| 2,511,330 | 6/1950 | Custer | 474/262 |
| 2,642,751 | 6/1953 | Freedlander | 474/262 |
| 2,985,222 | 5/1961 | Marty et al. | 474/252 |
| 3,738,188 | 6/1973 | Ray | 474/242 |
| 4,193,312 | 3/1980 | Cicognani | 474/256 |
| 4,321,049 | 3/1982 | Tangorra et al. | 474/265 |

FOREIGN PATENT DOCUMENTS 2038990  7/1980  United Kingdom .............. 474/244

*Primary Examiner*—Lawrence J. Staab
*Assistant Examiner*—Michael D. Bednarek
*Attorney, Agent, or Firm*—Stevens, Davis, Miller & Mosher

[57] ABSTRACT

A power transmission belt which is substantially V-shaped in cross-section has insert members which are resistant to transverse compression embedded in an elastomeric or plastomeric body. Protective layers of elastomer or plastomer having oriented fibers dispersed therein cover the flanks of the belt and, if necessary, are disposed in addition to the belt body adjacent to a base of the belt.

7 Claims, 4 Drawing Figures

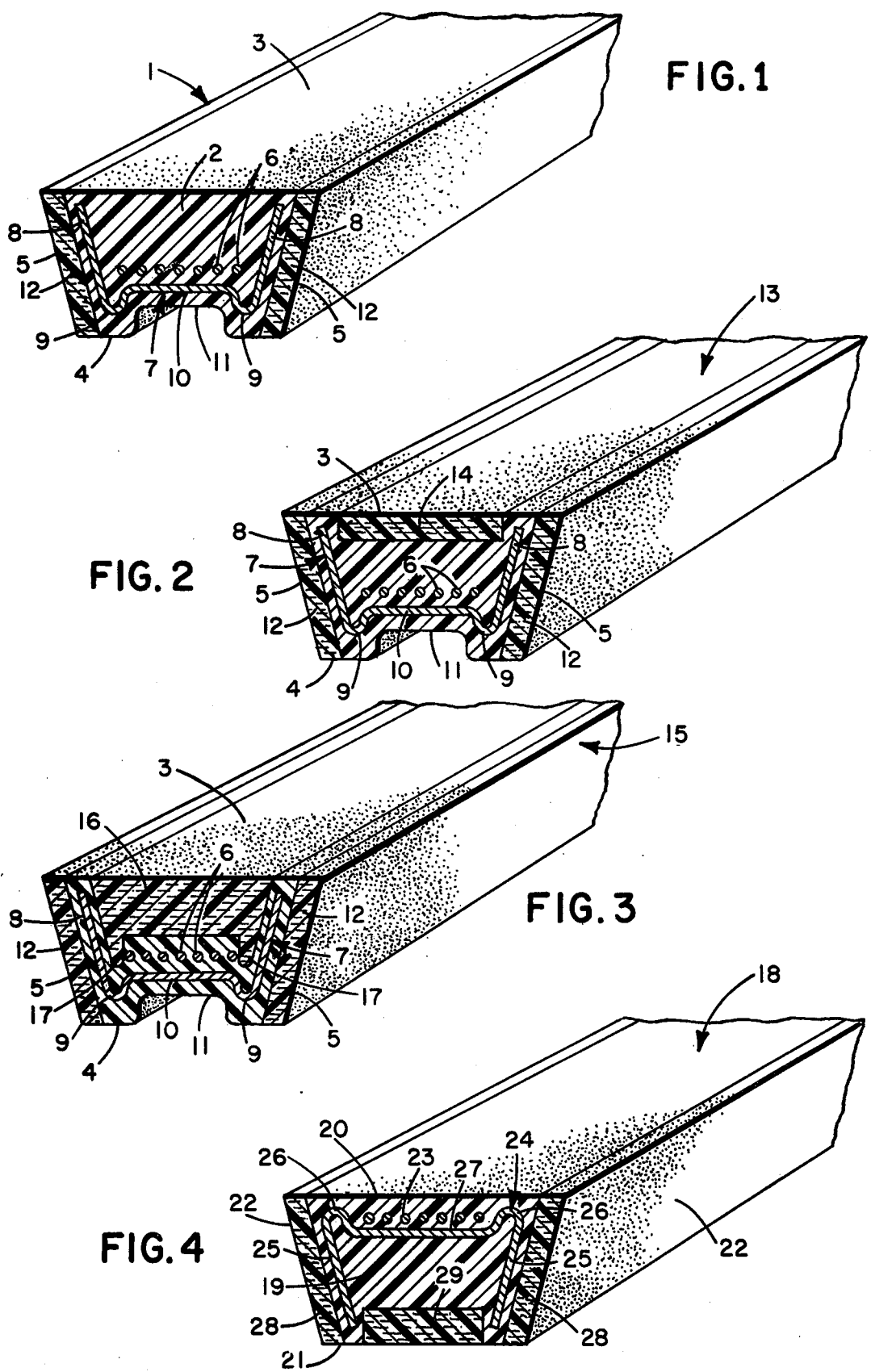
U.S. Patent   Jul. 3, 1984   4,457,743

POWER TRANSMISSION BELT

The present invention relates to a drive belt and, in particular, to a V-shaped motion transfer belt particularly well suited for use in speed variators.

V-shaped belts for speed variators, having embedded in an elastomeric or plastomeric body, a plurality of rigid insert members which provide both transverse stiffness and longitudinal flexibility, are known. These characteristics are absolutely necessary in a belt to be used in speed variators since the belt must resist transverse pressures acting on its flanks when it is wedged in the groove of a variable grooved pulley of a speed variator and must be wound on pulleys of very small diameters. This prior art type of belt has the drawback that the working surfaces wear and reduce the life of the belt.

An object of the present invention is to overcome the drawbacks of the known drive belts, in particular for use in speed variators, both by reducing wear on the working surfaces and by lowering the temperature during operation, and to increase the efficiency of motion transmission by decreasing the energy absorbed by the belt by hysteresis.

Another object of the invention is to provide a motion transmission endless belt having a substantially V-shaped cross-section having elements embedded therein to resist longitudinal stretching and lateral compression of the belt body while in operation and having a means for distributing compact pressures substantially uniformly over the flanks of the belt body.

Other objects will become apparent from the following description with reference to the accompanying drawing wherein:

FIG. 1 is a perspective view, partially in section of one embodiment of the belt provided by the invention; and FIGS. 2, 3 and 4 are perspective views, partially in section, of second, third and fourth embodiments of the belt provided by the invention.

The foregoing objects and other are accomplished in accordance with this invention, generally speaking, by providing an endless substantially V-shaped drive belt having an elastomeric or plastomeric body having a major base, a minor base and two lateral converging flanks, a traction resistant insert member comprising a plurality of parallel, flexible and inextensible cords which are parallel and coplanar to each other and extend longitudinally through the belt body, and a plurality of transverse resistant insert members embedded and longitudinally spaced along the belt body characterized by the fact that the belt comprises means for uniformly distributing pressures exerted on the convergent flanks of the belt. The means for uniformly distributing pressure applied to the belt flanks is preferably a protective surface layer of plastomer or elastomer containing embedded wire or resinous fibers which are harder than the elastomer or plastomer in which they are dispersed over the surface of the flanks. The fibers or wires are oriented perpendicularly to the surface of the flanks.

The present invention thus contemplates in its more general aspects a V-shaped endless drive belt having an elastomeric or plastomeric body having embedded therein a traction resistant insert member formed by a plurality of substantially parallel cords of flexible and inextensible material disposed longitudinally therein, and a plurality of embedded transverse insert members, and means for distributing uniformly contact pressures acting on the side flanks of the belt.

Referring now to the drawing, FIG. 1 shows in section and in perspective view a V-shaped endless belt 1 particularly suitable for use in speed variators which are provided with variable grooved pulleys. Belt 1 comprises an endless elastomeric or plastomeric body provided with a base 3, a narrower base 4 and two lateral convergent side flanks 5 between the bases. In the body 2, a traction resistant insert member 6, comprising a plurality of parallel and coplanar cords extending longitudinally through the whole development of the belt, is embedded. Cords 6 are steel but may be any other suitable and inextensible material such a nylon, glass fibers, polyamidic (e.g. nylon 6) or aramide fiber, polyester, rayon, or the like. In the body 2 are totally embedded also a plurality of metal insert members 7 which are resistant to transverse pressures exerted on the belt. The members 7 are distributed along the length of the belt with a constant and/or variable pitch. Members 7 are rigid and are preferably metal strips such as harmonic steel which are folded, shaped, heat-treated and suitably covered with an adhesive which improves bonding to the elastomeric material of the belt. Strips 7 are bent into two portions 8 parallel to the lateral convergent flanks 5 and, extend adjacent to the flanks through substantially the whole length of flanks 5.

Two belt portions 9 are integral with portions 8 through a first 180° loop followed by a second 90° loop. Bent portions 9 are adjacent in such a way that they guide the development of strips 7 towards the inside of belt 1 (as shown in the Figure).

The two bent portions 9 of strips 7, are joined by a rectilinear segment 10, parallel either to base 3 or to base 4. In the particular embodiment shown in FIG. 1, rectilinear segment 10 is parallel and adjacent to the narrower base 4. Narrower base 4 comprises, as shown in FIG. 1, a continuous longitudinal groove 11, which can be missing in some embodiments.

Moreover, the cords of traction resistant insert member 6 are preferably substantially in contact with the rectilinear segment 10 of strips 7 and by that is meant that there in only a thin rubber layer between cords 6 and rectilinear segment 10.

Moreover cords 6 are preferably above the rectilinear section 10 and i.e. they are arranged between the latter and the major base 3.

Belt 1, shown in FIG. 1 comprises, moreover, means for uniformly distributing the contact pressures acting on the convergent flanks of the belt over the surfaces of the flanks. In the illustrated embodiment, an elastomeric or plastomeric layer 12 having lengths of embedded fibers which are oriented substantially perpendicularly to the surface of the lateral convergent flanks 5 of the belt are bonded to the surfaces of flanks 5. Fiber lengths are generally pointed out with brief continuous tracts in the mass of the layers 12. Layers 12 are equal in height to the height of the flank 5 and extend the entire length of the flanks. The fibers are aromatic polyamide fibers but may be instead, carbon fibers or other synthetic or natural fibers or, alternately may be metallic wire segments.

FIG. 2 shows in section and in perspective view a belt 13, similar to belt 1, previously described, and therefore the same reference numbers are used to indicate the same elements, in which the means for uniformly distributing the contact pressures over the flanks have a different form.

The means for uniformly distributing contact pressure on the flanks, besides the above mentioned elastomeric layers 12 having lengths of embedded oriented fibers which are perpendicular to the surface of the lateral convergent flanks 5, have another elastomeric or plastomeric layer 14 having lengths of embedded fibers of the same kind as the fibers of layers 12, oriented substantially perpendicularly to the longitudinal plane of symmetry of the belt 13.

In other words, the fibers of layer 14 lie in planes parallel to the plane of the transverse section of the belt 13 shown in FIG. 2. Layer 14 is arranged in this particular embodiment adjacent to base 3. Therefore layer 14 extends transversely between the free ends of sections 8 parallel to the lateral convergent flanks 5 of the strip 7.

In fact, as shown in FIG. 2, the free ends of sections 8 are disposed between layer 14 and layer 12. Alternately, layer 14 can extend further covering the entire surface of base 3 and contacting with its lateral edges, the layers 12 so as to weld with them thereby forming a single body with the latter.

In FIG. 3 a belt 15 according to the present invention is shown in section and in perspective view. Belt 15 comprises an alternate embodiment of layer 14 of the belt 13 of FIG. 2. In the belt 15, in fact, layer 16 is adjacent to the larger base 3 of the belt and extends into body 2 with two segments 17, towards the smaller base 4. Segments 17 are adjacent to the sides of sections 8 of the strips 7 facing the longitudinal axis of symmetry of the belt. The two segments 17 can have extension equal to zero (this is the case of belt 13 of FIG. 2) up to filling the concavity formed by the 180° loop of section 9 of the strip 7. Segments 17 comprise lengths of fibers oriented perpendicularly to the longitudinal plane of symmetry of the belt similar to the rest of layer 16.

The embodiments of a drive belt according to the present invention shown in FIGS. 1 to 3 can, moreover, comprise a covering fabric, of a known kind used for V-drive belts, over the smaller base 4.

FIG. 4 shows in section and in perspective view another alternate embodiment of a drive belt according to the present invention. The alternative embodiment is a belt 18 comprising an elastomeric or plastomeric body 19 provided with a larger base 20, a smaller base 21 and two lateral converging flanks 22. Body 19 comprises a traction resistant insert member 23 formed by a number of parallel and coplnar cords of flexible and inextensible material such as the insert member 6 of belt 1 in FIG. 1 and a plurality of transverse insert members formed preferrably by metallic strips 24, folded and shaped and subsequently heat-treated to have sections 25 parallel to the lateral convergent flanks 22 which extend for the entire length of the latter, bent sections 26 presenting in order a 180° loop and successively a 90° loop and a rectilinear section 27, joining the two bent sections 26, adjacent to and parallel with the larger base 20. Rectilinear section 27 is, moreover, substantially in contact with the cords of the traction resistant insert member 23 and the latter is between section 27 and the larger base 20. Also belt 18 shown in FIG. 4 comprises, as means for making uniform the contact pressures which act on the lateral convergent layers having lengths of fibers (of the same material previously mentioned) embedded therein and oriented perpendicularly to the surface of the lateral flanks. The means for uniformly distributing the contact pressure can comprise, as shown in FIG. 4, another elastomeric or plastomeric layer 29 having dispersed therein fibers oriented perpendicularly to the longitudinal plane of symmetry of the belt. Layer 29 is arranged in correspondence of the smaller base 21 of the belt 18. Layer 29, as in the alternative embodiment described in FIGS. 2 and 3 can extend transversally so as to encounter the layers 28 and weld with the latter or extend with two segments towards the larger base 20 adjacent to the side of the section 25 facing the longitudinal plane of symmetry so as to enter into the 180° loop of the bent section 26.

Any suitable elastomeric composition such as synthetic rubber, polyurethane and the like may be used for forming the body of the belts of the present invention such as, for example, a composition containing:

| | |
|---|---|
| NEOPRENE GRT | 100 parts by weight |
| ZINC OXIDE (ZnO) | 5 " |
| MAGNESIUM OXIDE (MgO) | 4 " |
| CARBON BLACK SRF | 50-100 " |
| STEARIC ACID | 2 " |
| ANTIAGING AGENT (octylated dyphenilammine) | 2 " |

An elastomeric composition suitable for making the different layers having lengths of fibers embedded therein for the belts such as layer 28 has the following formulation:

| | |
|---|---|
| NEOPRENE GRT | 100 part by weight |
| ZINC OXIDE (ZnO) | 5 " |
| MAGNESIUM OXIDE (MgO) | 4 " |
| CARBON BLACK SRF | 30-100 " |
| STEARIC ACID | 2 " |
| ANTIAGING AGENT (octylated dyphenilammine) | 2 " |
| FIBER | 20 " |

The foregoing objects are achieved with a drive belt of the kind described. The drive belt provided by the present invention has been shown by tests to wear less than belts which are similar thereto but do not have the layers in which fibers oriented perpendicularly to the surface of the converging lateral flanks are embedded. In fact, the belts provided by the present invention have a bearing surface which corresponds substantially to the surfaces of the pulley faces and the ends of the embedded lengths of fibers bear most of the contact pressure, while the elastomeric material in which the fibers are embedded bear a sufficiently smaller share of the contact pressure to guarantee traction between the belt and pulley. The lengths of fibers are much harder than the material in which they are embedded and therefore after a first light wearing of the elastomer material, the end of the lengths of fibers emerge from the surface of the belt flank, and the end surfaces of the fibers bear most of the pressures exerted by the pulley grooves. The lengths of fibers, moreover, embedded in the elastomeric or plastomeric material, operate as hooped rods since they transfer the pressures from the rigid surface of the pulley grooves to another rigid surface of the belt, the section of the strips such as 28 parallel to the flanks of the belt, and therefore they will resist more the combined bending and compressive stress without collapsing and this translates into greater pressures on the belt flanks.

All that reduces wear of the belt flanks and therefore increases the useful life of the belt.

This behavior of the lengths of fibers as hooped rods, with the relative above mentioned advantages and with those which are indicated herebelow, is due to the characteristics provided by the combination formed both by the lengths of fibers and by the elastomeric or plastomeric material in which they are embedded and not by a simple addition of the characteristics of the single elements forming the combination. Moreover, the lengths of fibers embedded in the layers arranged along the flanks, uniformly distribute the pressures, exerted on the belt flanks in the direction of the development of the belt. These layers having the lengths of fibers embedded therein which cover the flanks both in the parts which correspond to the transverse stiffening insert members and in correspondence of the parts between adjacent transverse insert members.

The continuity of the layer insures improved resistance to those forces which tend to deform the elastomeric material between adjacent transverse insert members, in particular when the belt winds on the pulleys. In fact, on the one hand, the fibers bear against the rigid surfaces of the pulley grooves and therefore check the deformation of the elastomeric material in which they are embedded while at the same time the fibers, in correspondence of the parts provided with the transverse insert members, check sliding towards the inside of the elastomeric material in which the fibers are embedded in the parts between adjacent insert members because of the continuity of the layer in which the fibers are dispersed.

Finally the orientation of the fibers perpendicularly to the surface of the flanks is very important for obtaining reduced wear and consequently a long service life.

With such orientation, the fibers are arranged perpendicularly to two rigid parallel surfaces (the pulley groove towards the outside and the transverse insert members facing the inside, respectively) so they transfer better the contact pressure from the grooves of the pulley to the belt with greater efficiency and with a globally lower stress. Also, because they are embedded in the elastomeric or plastomeric material, the fibers operate as hooped rods which are subjected to bending and compressive stress. If on the contrary, the fibers were inclined at an angle less than perpendicular with respect to these surfaces (for example arranged perpendicularly to the longitudinal plane of symmetry of the belt such as the fiber of the layer adjacent to the bases) then the contact pressure would be transformed partly into bending and compressive stress transfered from one surface (pulley groove) to the other surface parallel to the latter (resistant transverse insert member embedded in the belt) i.e. into useful work carried out by the belt, but partly also into a moment which would tend to move the single length of fibers making it rotate in opposition to the material in which they are embedded and therefore this share of the contact pressure would be dissipated in the layer which the fibers were embedded and would be lost work as far as the transmission is concerned with consequent lower efficiency of the transmission.

Moreover this dissipation of work (i.e. energy) would increase the working temperature of the belt with consequent decrease of the useful life of the latter. All this becoming worse with the increase of the real angle between the axes of the lengths of fiber and the line perpendicular to the surface of the belt flanks.

Moreover, the particular structure of the layers arranged in the flanks which have the lengths of fibers embedded therein, guarantees the maintenance of the same contact characteristics between the belt flanks and the pulley grooves for all the useful life of the belt (in particular contact pressure and traction). Even if limited with respect to the known belt, a certan wear exists also in the belts of the present invention, but this wear does not adversely affect the above characteristics since it changes the surface structure of the flanks of the belt. On the contrary, the wear of the flanks of belts of the invention renews the surface layer of the flanks giving rise, on the layer of the flanks, to a layer having the same characteristics of the worn one and therefore the characteristics of the surface layer are constant with the passage of time. Moreover, by changing the thickness of the layer in which the lengths of fibers are embedded bonded to the flanks of the belt, a belt whose flank life is almost equal to the traction resistant insert member's life is obtained.

Also the elastomeric or platomeric layer, in which lengths of fibers oriented perpendicularly to the longitudinal plane of symmetry of the belt are embedded and set in correspondence of one of the two bases, contributes to fulfillment of the objects. This layer of the shaped strip constitutes the resistant transverse insert member and therefore it reduces also the amplitude of the transverse deformation cycle of the belt consequently lowering the belt temperature and increasing the resistance to fatigue of the shaped strips constituting the transverse resistant insert member. In fact, when the belt begins to wind on a pulley the ends of the strips tend to bend towards the longitudinal plane of symmetry of the belt.

This deformation is however prevented by the presence of the layer in which the oriented fibers are embedded. The layer acts as a strut which is substantially in contact in its own lateral flanks with both ends. Besides the bending radius assumed by the belt is such that the layer is pushed more strongly against the strip ends which therefore cannot deform. This is even more guaranteed by the oriented lengths of fibers which are subjected to bending and compressive stress. First of all, contact on the entire surface of the flank is uniform in the direction of the height of the flank, between the belt flank and the surfaces of the pulley grooves since the flank cannot deform because of the presence of the section of the shaped strips parallel and adjacent to the flank. This section is blocked at its own ends by a side of the layer in which the oriented fibers are embedded and are disposed adjacent to the base and on the other side by the continuity provided by the bent section of the strip. Practically it turns out that the section of the shaped strip parallel to the belt flanks is parallel to the belt flank and, more particularly, to the pulley groove.

This is true also in case that the layer extends towards the opposite base on the side of the section of the strips forming the transverse resistant insert member facing the longitudinal plane of symmetry of the belt.

The most uniform contact between belt flank and pulley groove results in a more uniform wear which is better distributed on the entire flank of the belt and therefore into greater efficiency of power transmission by the belt of the present invention.

Above all the smaller deformations of the transverse insert members reduce very much the hysteresis losses since the belt body is not subjected to significant deformations transverse to the body. These smaller losses by hysteresis increase the efficiency of the power transmission but above all, it has been shown by experimental tests carried out on the belts of the present invention that the temperature during operation of the belt is reduced thus increasing its useful life.

All these advantages have been obtained, in belts provided by the present invention, by a structure in which transverse deformation of the belt body is negligable and guarantees at the same time suitable longitudinal flexibility and good bonding of rubber to metal.

Although the invention has been described in detail for the purpose of illustration, it is to be understood that variation can be made by those skilled in the art without departing from the spirit and scope of the invention except as it is limited by the claims.

What is claimed is:

1. A V-belt comprising an elastomeric or plastomeric body having a major base, a minor base and two lateral convergent flanks, a traction-resistant insert member comprising a plurality of flexible and inextensible cords embedded into the body which are parallel and coplanar to each other, a series of longitudinally-spaced rigid members extending transversely across the belt body, characterized in that said belt comprises a continuous elastomeric or plastomeric layer covering each flank of the belt and having fibers dispersed substantially uniformly therein which are oriented perpendicularly to the surface of the lateral convergent flanks.

2. The belt of claim 1, characterized in that it further comprises an elastomeric or plastomeric continuous layer having lengths of fibers dispersed substantially uniformly therein and oriented perpendicularly to the longitudinal plane of symmetry of the belt, and disposed adjacent to at least one of the bases and substantially parallel thereto.

3. The belt of claim 2, characterized in that said continuous layers, embedding lengths of fibers, have substantially the same composition as the belt body.

4. The belt of claim 3, characterized in that said minor base comprises a continuous longitudinal slot.

5. The belt of claim 1, characterized in that said cords are substantially in contact with and placed above the rectilinear section which is parallel and adjacent to one of the bases of said transverse insert member.

6. An endless belt for association with spaced pulleys to transform motion therebetween, comprising an elastomeric or plastomeric body which has a substantially frusto-triangularly shaped cross-section with a first substantially flat face and a second substantially flat face which is wider than said first face, and converging sidewalls forming flanks for the belt adapted to contact a pulley when the belt is looped about the pulley, flexible and inextensible laterally-spaced coplanar wires embedded within and extending longitudinally throughout the length of the body, a series of longitudinally-spaced metal members extending transversely across the belt body shaped into a generally U-shape with the open end thereof facing one of the faces of the closed end adjacent to and substantially parallel to the other of said faces, and sidewalls integral with said closed end and upstanding therefrom disposed in the belt body with each substantially parallel to the adjacent flank, said closed end and said sidewalls being joined through a first 180° bend and a second 90° bend, said metal members reinforcing the belt body against deformation, and a continuous elastomeric or plastomeric layer covering each of said flanks and having fibers dispersed substantially uniformly therein which are oriented substantially perpendicular to the longitudinal plane of symmetry of the belt.

7. The endless belt of claims 6, comprising a continuous elastomeric or plastomeric insert member having fibers dispersed therein which are oriented substantially perpendicular to the longitudinal plane of symmetry, and disposed in the belt body between said sidewalls of the longitudinally-spaced metal members.

* * * * *